(12) United States Patent
Han (10) Patent No.: US 10,000,193 B2
(45) Date of Patent: Jun. 19, 2018

(54) INTEGRATED DYNAMIC BRAKE APPARATUS

(71) Applicant: MANDO CORPORATION, Pyeongtaek-si, Gyeonggi-do (KR)

(72) Inventor: Sang-Soo Han, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days. days.

(21) Appl. No.: 14/919,541

(22) Filed: Oct. 21, 2015

(65) Prior Publication Data

US 2016/0107629 A1 Apr. 21, 2016

(30) Foreign Application Priority Data

Oct. 21, 2014 (KR) .................. 10-2014-0142810
Oct. 21, 2014 (KR) .................. 10-2014-0142812
Oct. 19, 2015 (KR) .................. 10-2015-0145256

(51) Int. Cl.
*B60T 8/36* (2006.01)
*B60T 13/74* (2006.01)
(Continued)

(52) U.S. Cl.
CPC .............. *B60T 13/745* (2013.01); *B60L 7/26* (2013.01); *B60T 7/042* (2013.01); *B60T 8/368* (2013.01)

(58) Field of Classification Search
CPC ........ B60T 7/042; B60T 8/368; B60T 8/3675; B60T 8/4086; B60T 13/165; B60T 13/745
(Continued)

(56) References Cited

U.S. PATENT DOCUMENTS 5,236,257 A * 8/1993 Monzaki ............... B60T 8/3265
303/114.1
5,288,141 A * 2/1994 Isshiki ................... B60T 8/344
303/119.1
(Continued)

FOREIGN PATENT DOCUMENTS

JP 2001-225742 A 8/2001
JP 2003-521419 A 7/2003
(Continued)

OTHER PUBLICATIONS

Office Action Korean Patent Application No. 10-2014-0142812 dated Jul. 29, 2015.
(Continued)

*Primary Examiner* — Thomas W Irvin
(74) *Attorney, Agent, or Firm* — McDermott Will & Emery LLP (57) ABSTRACT

An integrated dynamic brake apparatus includes a hydraulic pressure generating unit configured to convert rotational power of a motor into linear reciprocating movement, a brake actuation unit including a master cylinder in which a pump piston included in the hydraulic pressure generating unit is accommodated, a valve block disposed over the motor and configured to control discharging of a fluid accommodated in the master cylinder, and an electronic control unit disposed at one side of the motor and configured to control the motor and the valve block, wherein the pump piston linearly reciprocates along a first axis perpendicular to an axis of rotation of the motor.

14 Claims, 5 Drawing Sheets

(51) Int. Cl.
*B60T 7/04* (2006.01)
*B60L 7/26* (2006.01)

(58) Field of Classification Search
USPC .............. 303/113.4, 115.2, 119.3, DIG. 10
See application file for complete search history.

(56) References Cited

U.S. PATENT DOCUMENTS

| | | | | |
|---|---|---|---|---|
| 5,407,260 | A * | 4/1995 | Isshiki | B60R 16/0239 303/113.1 |
| 5,678,671 | A * | 10/1997 | Leimbach | B60T 13/745 192/114 R |
| 5,695,259 | A * | 12/1997 | Isshiki | B60R 16/0239 303/119.2 |
| 7,663,273 | B2 * | 2/2010 | Shiino | B60T 8/267 310/59 |
| 7,722,133 | B2 * | 5/2010 | Suzuki | B60T 8/367 303/10 |
| 7,922,264 | B2 * | 4/2011 | Baumann | B60T 8/4081 303/114.1 |
| 8,468,820 | B2 * | 6/2013 | Drumm | B60T 7/042 60/545 |
| 8,818,672 | B2 * | 8/2014 | Takeda | B60T 13/745 303/10 |
| 9,592,811 | B2 * | 3/2017 | Deng | B60T 11/18 |
| 9,776,604 | B2 * | 10/2017 | Lee | B60T 1/10 |
| 9,815,445 | B2 * | 11/2017 | Cann | B60T 13/746 |
| 2008/0088176 | A1 * | 4/2008 | Ota | B60T 8/3675 303/155 |
| 2010/0126167 | A1 * | 5/2010 | Nagel | B60T 13/745 60/545 |
| 2012/0167565 | A1 * | 7/2012 | Richard | B60T 13/745 60/545 |
| 2012/0192556 | A1 * | 8/2012 | Verhagen | B60T 8/38 60/585 |
| 2014/0203626 | A1 * | 7/2014 | Biller | B60T 8/4081 303/10 |
| 2015/0061361 | A1 * | 3/2015 | Maruo | B60T 11/224 303/10 |
| 2015/0158466 | A1 * | 6/2015 | Nakamura | B60T 11/16 303/3 |
| 2015/0158474 | A1 * | 6/2015 | Matsunaga | B60T 11/16 60/545 |
| 2016/0107629 | A1 * | 4/2016 | Han | B60T 13/745 303/113.2 |
| 2016/0185329 | A1 * | 6/2016 | Lee | B60T 8/4081 303/10 |
| 2016/0185330 | A1 * | 6/2016 | Lee | B60T 1/10 303/10 |
| 2017/0341632 | A1 * | 11/2017 | Han | B60T 8/368 |
| 2018/0001881 | A1 * | 1/2018 | Huang | B60T 13/745 |

FOREIGN PATENT DOCUMENTS

| | | |
|---|---|---|
| JP | 2006-168705 A | 6/2006 |
| JP | 2012-517935 A | 8/2012 |
| KR | 10-2010-0023665 A | 3/2010 |
| KR | 10-2013-0110314 A | 10/2013 |

OTHER PUBLICATIONS

Office Action Korean Patent Application No. 10-2014-0142810 dated Aug. 20, 2015.

* cited by examiner

… …
INTEGRATED DYNAMIC BRAKE APPARATUS

CROSS-REFERENCE TO RELATED APPLICATIONS

The subject application claims priority to Korean Patent Application No. 10-2014-0142812 filed Oct. 21, 2014, Korean Patent Application No. 10-2014-0142810 filed Oct. 21, 2014, and Korean Patent Application No. 10-2015-0145256 filed Oct. 19, 2015. The subject matter of each is incorporated herein by reference in entirety.

TECHNICAL FIELD

The present invention relates to an integrated electronic control dynamic brake apparatus, and more particularly, to an integrated dynamic brake apparatus which includes a brake actuation unit constituted by a master cylinder, a pedal simulator, and so on, an ABS/ESC unit, and a worm gear and a rack gear configured to provide a hydraulic pressure generating unit as a single unit.

BACKGROUND ART

In recent times, the development of a hybrid vehicle, a fuel cell vehicle, an electric vehicle, or the like, has been actively performed to improve fuel efficiency and reduce an exhaust gas. A brake apparatus i.e., a brake apparatus for a vehicle is necessarily installed in such a vehicle, and here, the brake apparatus for a vehicle is an apparatus for reducing a speed of a moving vehicle or stopping the vehicle. A conventional brake apparatus for a vehicle is classified as a vacuum brake configured to generate a brake pressure using a suction pressure of an engine, and a hydraulic brake configured to generate a brake pressure using a hydraulic pressure.

The vacuum brake is an apparatus for providing a larger braking force with a small force using a pressure difference between a suction pressure of a vehicle engine at a vacuum booster and an atmospheric pressure, i.e., an apparatus for generating a output force sufficiently larger than a force applied to a pedal when a driver presses down on a brake pedal.

The conventional vacuum brake should supply the suction pressure of the vehicle engine at the vacuum booster to form a vacuum state, and thus, fuel efficiency is reduced. In addition, in order to form the vacuum state even upon stoppage of the vehicle, the engine should be driven always.

In addition, since the fuel cell vehicle and the electric vehicle have no engine, a conventional vacuum brake configured to amplify the pedal pressure of a driver during braking cannot be applied. In the case of the hybrid vehicle, since an idling stop function should be implemented upon stoppage to improve the fuel efficiency, a hydraulic brake is required to be introduced.

That is, as described above, since a recovery brake function should be implemented in all vehicles to improve fuel efficiency, the function can be easily implemented when the hydraulic brake is introduced.

Meanwhile, an electronic control brake apparatus serving as a type of hydraulic brake is a brake apparatus for detecting a pedal operation of a driver using an electronic control unit and supplying a hydraulic pressure to a master cylinder to transfer a brake hydraulic pressure to wheel cylinders of wheels to generate a braking force.

The electronic control brake apparatus comprises a brake actuation unit (BAU) constituted by a master cylinder, a reservoir, a pedal simulator, an input rod assembly, and so on, to control a brake hydraulic pressure applied to the wheel cylinders, an anti-lock brake system (ABS)/electronic stability control (ESC) unit configured to independently control the braking force of the wheels, and a hydraulic pressure generating unit constituted by a motor, a pump, a control valve, and so on.

However, since the units that constitute the electronic control brake apparatus are separately provided and installed, a mounting space is required to be secured due to the limitation of the mounting space of the vehicle, and a weight thereof is increased. For this reason, an integrated electronic control dynamic brake apparatus having a simplified structure to improve stability of the brake and a mounting property of the vehicle according to necessity has been developed.

CITATION LIST

Patent Literature (Patent Literature 1) Korean Laid-open Publication No. 10-2013-0110314

SUMMARY

In order to solve the problems, the present invention is directed to provide an integrated electronic control dynamic brake apparatus including a worm gear and a rack gear and capable of solving a problem related to a mounting property of a vehicle due to an excessive length of the other integrated electronic control dynamic brake apparatus configured to generate a brake pressure with a pump using a conventional ball screw.

In addition, the present invention is directed to provide an integrated electronic control dynamic brake apparatus including a worm gear and a rack gear and capable of solving problems related to cost and mounting properties due to the necessity of a separate ECU configured to control valves of a valve block, in addition to an ECU configured to control a position of a motor.

In order to accomplish the above-mentioned aspects, an integrated dynamic brake apparatus according to an embodiment of the present invention includes a hydraulic pressure generating unit configured to convert rotational power of a motor into linear reciprocating movement, a brake actuation unit including a master cylinder in which a pump piston included in the hydraulic pressure generating unit is accommodated, a valve block disposed over the motor and configured to control discharging of a fluid accommodated in the master cylinder, and an electronic control unit disposed at one side of the motor and configured to control the motor and the valve block, wherein the pump piston linearly reciprocates along a first axis perpendicular to an axis of rotation of the motor.

The hydraulic pressure generating unit may include a worm shaft disposed at the other side of the motor and coaxially connected to a rotor of the motor; and a worm wheel engaged with the worm shaft and configured to rotate about a second axis perpendicular to both of the axis of rotation of the motor and the first axis based on rotation of the worm shaft.

The hydraulic pressure generating unit may further include a pinion having the same axis of rotation as that of the worm wheel; a rack bar engaged with the pinion and linearly moving in a first axis direction based on rotation of the pinion; and a pump piston connected to one side of the rack bar.

The hydraulic pressure generating unit may further include a hydraulic pressure generating unit housing configured to accommodate the worm shaft, the worm wheel, the pinion and the rack bar, and the other side of the motor may be disposed to come in contact with the hydraulic pressure generating unit housing.

A protrusion may be formed at one side of the rack bar, an insertion groove may be formed in the pump piston at a position corresponding to the protrusion, and the protrusion may be inserted into the insertion groove to couple the rack bar and the pump piston.

A spherical protrusion port may be formed at an end of the protrusion, a connector formed to accommodate the spherical protrusion port may be provided at an end of the insertion groove, and the protrusion port may be caulked to the connector.

A portion of the rack bar opposite to a portion engaged with the pinion may be supported by at least one bearing.

The brake actuation unit may include a brake actuation unit housing including the master cylinder formed to extend in the first axis direction; an input rod assembly inserted and coupled into the brake actuation unit housing along a second axis perpendicular to both of the axis of rotation of the motor and the first axis; and a pedal simulator accommodated in a portion of the brake actuation unit housing opposite to the input rod assembly.

One side and the other side of the valve block may be disposed to come in contact with each of the electronic control unit and the brake actuation unit housing.

The integrated dynamic brake apparatus may further include a reservoir in contact with an upper portion of the brake actuation unit housing.

A connector configured to apply 3-phase power to the motor and a magnetic body configured to detect a position of the motor may be disposed at one side of the motor.

The electronic control unit may include a valve coil configured to control opening/closing of the valve block; and a motor position sensor configured to detect a position of the motor by detecting a variation in magnetic flux of the magnetic body.

An integrated dynamic brake apparatus according to another embodiment of the present invention includes a hydraulic pressure generating unit configured to convert rotational power of a motor into linear reciprocating movement, a brake actuation unit including a master cylinder in which a pump piston included in the hydraulic pressure generating unit is accommodated, a valve block disposed over the motor and configured to control discharging of a fluid accommodated in the master cylinder, and an electronic control unit disposed at one side of the motor and configured to control the motor and the valve block, wherein one side of the motor comes in contact with a lower portion of a first surface of the electronic control unit and the other side of the motor is connected to a worm shaft, the valve block is disposed over the motor and one side surface of the valve block comes in contact with an upper portion of the first surface of the electronic control unit, and an axis of rotation of the worm shaft is perpendicular to the first surface and the pump piston linearly reciprocates to be parallel to a vertical direction of the first surface.

The hydraulic pressure generating unit may include a worm shaft disposed at the other side of the motor and coaxially connected to a rotor of the motor; and a worm wheel engaged with the worm shaft, wherein the axis of rotation of the worm wheel is perpendicular to the axis of rotation of the motor and parallel to a horizontal direction of the first surface.

The hydraulic pressure generating unit may further include a pinion having the same axis of rotation as that of the worm wheel; a rack bar engaged with the pinion and configured to linearly reciprocate in the vertical direction of the first surface based on rotation of the pinion; and a pump piston connected to one side of the rack bar.

DETAILED DESCRIPTION

Hereinafter, an exemplary embodiment of an integrated electronic control dynamic brake apparatus including a worm gear and a rack gear according to the present invention will be described in detail with reference to the accompanying drawings. First, in adding reference numerals to components of the drawings, the same reference numerals are designated by the same reference numerals throughout the drawings. In addition, in the description of the present invention, if it is determined that detailed description of known configurations or functions may cause the gist of the present invention to be unclear, the detailed description will be omitted.

Figure 1:
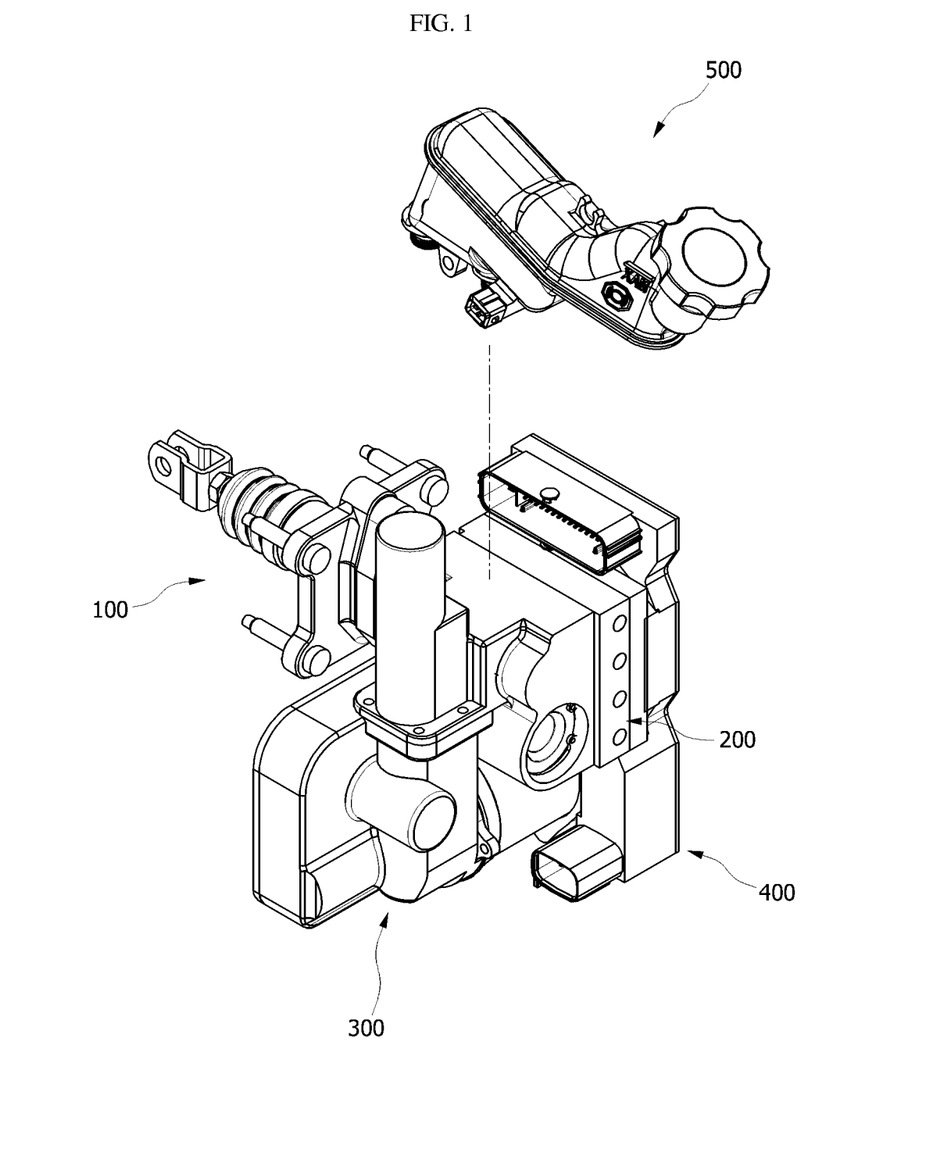
FIG. 1 is a perspective view of an integrated dynamic brake apparatus according to the present invention.
Figure 2:
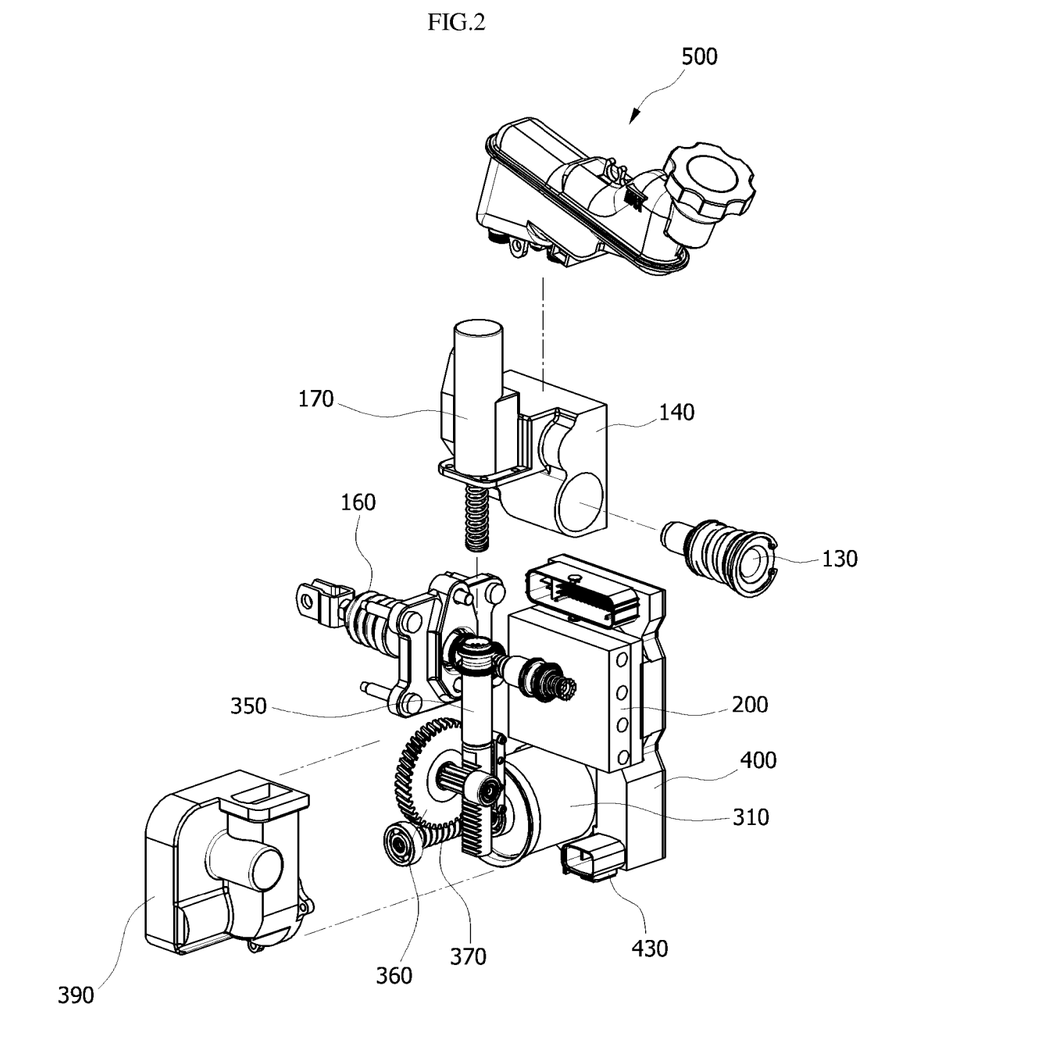
FIG. 2 is an exploded perspective view of the integrated dynamic brake apparatus according to the present invention.
Figure 3:
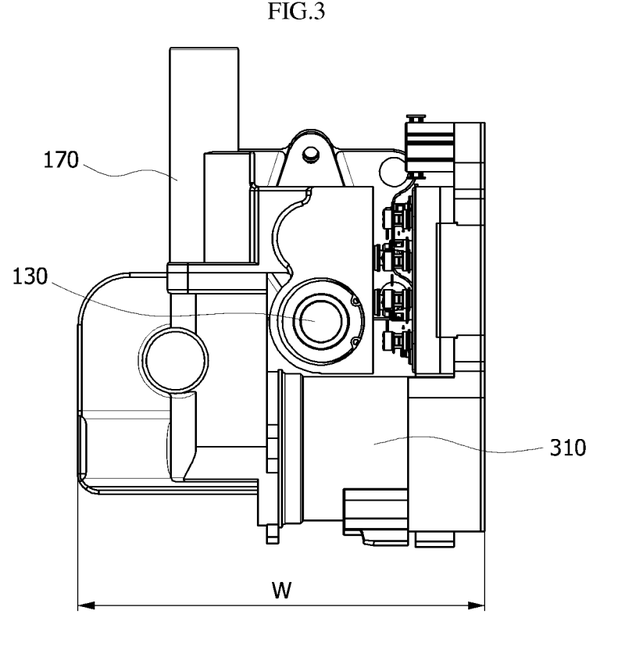
FIG. 3 is a front view of the integrated dynamic brake apparatus according to the present invention.
Figure 4:
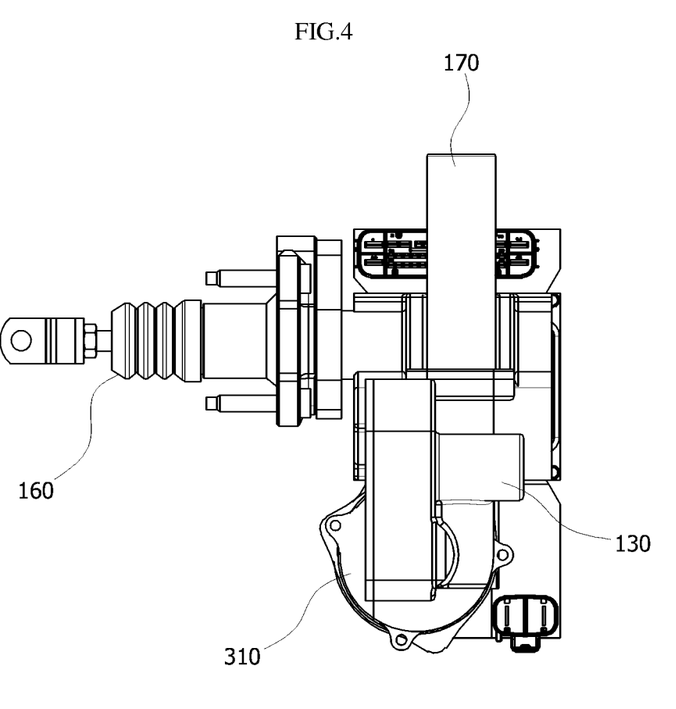
FIG. 4 is a side view of the integrated dynamic brake apparatus according to the present invention.
Figure 5:
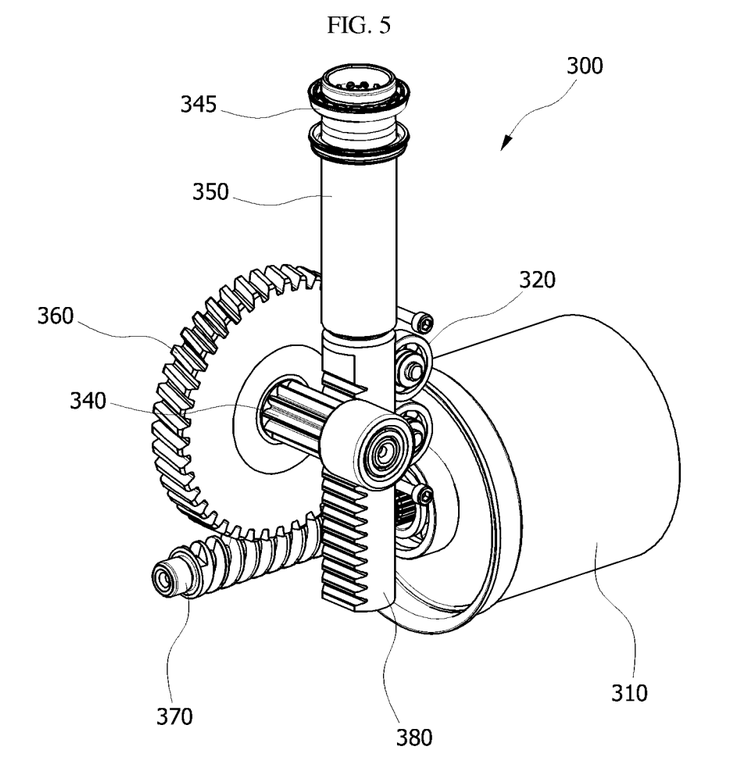
FIG. 5 is a view specifically showing a hydraulic pressure generating unit of the integrated dynamic brake apparatus according to the present invention.
Figure 6:
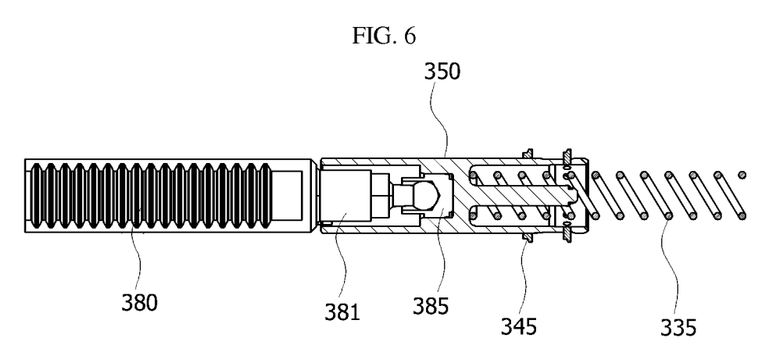
FIG. 6 is a view showing a coupled state of a rack bar and a pump piston of the integrated dynamic brake apparatus according to the present invention.

Hereinafter, the integrated dynamic brake apparatus according to the present invention will be described with reference to FIGS. 1 to 6. FIGS. 1 to 4 are a perspective view, an exploded perspective view, a front view and a side view of the integrated dynamic brake apparatus according to the present invention, FIG. 5 is a view specifically showing a hydraulic pressure generating unit of the integrated dynamic brake apparatus according to the present invention, and FIG. 6 is a view showing a coupled state of a rack bar and a pump piston of the integrated dynamic brake apparatus according to the present invention.

As shown in FIGS. 1 to 4, an integrated brake according to an embodiment of the present invention includes a large brake actuation unit 100, a valve block 200, a hydraulic pressure generating unit 300, an electronic control unit 400 and a reservoir 500.

Specifically, when a driver presses down on a brake pedal, the electronic control unit 400 acquires pedal pressure information transmitted by an input rod assembly 160 included in the brake actuation unit 100. The electronic control unit 400 controls a motor 310 included in the hydraulic pressure generating unit 300 based on the acquired pedal pressure information, and power conversion units of the hydraulic pressure generating unit 300 convert rotational power of the motor 310 into linear reciprocating movement. A pump piston 350 serving as a final stage of the hydraulic pressure generating unit 300 discharges a fluid in the master cylinder included in the brake actuation unit 100 toward a caliper installed at a wheel of the vehicle to generate a braking force, and the electronic control unit 400 controls the valve block 200 to control a flow of the fluid to perform functions of an anti-lock brake system (ABS), electronic stability control (ESC), and so on. Here, the valve block 200 is constituted by a plurality of valve units. In such a braking process, the master cylinder may additionally receive the fluid from the reservoir 500 according to necessity or discharge the fluid to the reservoir 500. Meanwhile, a pedal simulator 130 generates a pedal pressure on a pedal based on the pedal pressure of the driver to reduce a sense of difference in driving to a driver.

The integrated dynamic brake apparatus according to the embodiment of the present invention can minimize a weight and a volume thereof by integrally coupling the above-mentioned configurations, and thus, a degree of design freedom upon design of the vehicle can be secured. Hereinafter, the above-mentioned configurations will be described in detail. As described above, the hydraulic pressure generating unit 300 performs a function of converting rotational power of the motor 310 into linear reciprocating movement, and the brake actuation unit 100 includes a master cylinder in which the pump piston 350 included in the hydraulic pressure generating unit 300 is accommodated. As shown in FIGS. 1 to 4, the valve block 200 is disposed over the motor 310, and the electronic control unit 400 controls the motor 310 and the valve block 200. In particular, the pump piston 350 performs the linear reciprocating movement along a first axis perpendicular to an axis of rotation of the motor 310, and specifically, as shown in FIGS. 1 to 4, a master cylinder 170 is formed in an upward direction, i.e., a direction parallel to a longitudinal direction of the electronic control unit 400, and the pump piston 350 is accommodated in the master cylinder 170 to perform a function of discharging the fluid in the master cylinder 170.

A specific configuration of the hydraulic pressure generating unit 300 in which the axis of rotation of the motor 310 and the reciprocating direction of the pump piston 350 are perpendicular to each other will be described in detail with reference to FIG. 5. As shown in FIG. 5, the hydraulic pressure generating unit 300 of the integrated dynamic brake apparatus according to the embodiment of the present invention is constituted by a worm shaft 370, a worm wheel 360, a pinion 340, a rack bar 380 and the pump piston 350. The worm shaft 370 is disposed at the other side of the motor 310 and coaxially connected to a rotor of the motor 310. The worm wheel 360 is engaged with the worm shaft 370 and rotated based on rotation of the worm shaft 370, and the axis of rotation of the worm shaft 370 is formed to be perpendicular to the first axis in the linear reciprocating movement direction of the pump piston 350 and the axis of rotation of the motor 310. Eventually, the axis of rotation of the motor 310, the movement direction of the pump piston 350 and the axis of rotation of the worm shaft 370 are perpendicularly formed as an X-axis, a Y-axis and a Z-axis in a three-dimensional orthogonal coordinate system. The pinion 340 has the same axis of rotation as that of the worm wheel 360, and the rack bar 380 is engaged with the pinion 340 to linearly move in the first axis direction based on rotation of the pinion 340. The pump piston 350 is connected to one side of the rack bar 380, and the connection between the pump piston 350 and the rack bar 380 will be described in detail with reference to FIG. 6.

In general, the pump piston 350 and the rack bar 380 can be coupled in a press-fit structure, and in this case, an offset load may occur upon linear movement of the pump piston 350 according to an assembly condition of power transmission units of the worm wheel 360, the worm shaft 370, and so on. In this case, since the pump piston 350 and so on become worn and backlash is increased between the power transmission units, noise may occur and precise brake control may become impossible. Accordingly, in the integrated dynamic brake apparatus according to the embodiment of the present invention, a protrusion 381 is formed at one side of the rack bar 380, an insertion groove is formed in the pump piston 350 at a position corresponding to the protrusion 381, and the protrusion 381 is inserted into the insertion groove to couple the rack bar 380 and the pump piston 350. In particular, a spherical protrusion port is formed at an end of the protrusion 381, a connector 385 formed to accommodate the spherical protrusion port is installed at an end of the insertion groove, and then, the protrusion port is caulked to the connector 385. Regardless of the assembly condition of gears, generation of the offset load upon linear movement of the pump piston 350 can be prevented to prevent generation of noise due to the backlash between the gears. Further, after caulking the assembly to the pump piston 350, since the rack bar 380 can freely linearly move in a space generated in the connector 385, a spring 335 that constitutes a pump piston device may be omitted according to a system tuning value of the brake apparatus.

Meanwhile, in the integrated dynamic brake apparatus according to the embodiment of the present invention, the hydraulic pressure generating unit 300 may further include a hydraulic pressure generating unit housing 390 and a bearing 320. The hydraulic pressure generating unit 300 may be configured to accommodate the worm shaft 370, the worm wheel 360, the pinion 340 and the rack bar 380, and in particular, is preferably disposed to come in contact with the other side of the motor 310. The bearing 320 is disposed at a portion of the rack bar 380 engaged with the pinion 340 and has a function of supporting the rack bar 380. In the case of the integrated dynamic brake apparatus according to the embodiment of the present invention, as described above, since a longitudinal direction of the master cylinder 170 is vertically formed and the pump piston 350 is needed be vertically reciprocally moved in the longitudinal direction of the master cylinder 170, a single or a plurality of bearings 320 are installed to support the pump piston 350 and the rack bar 380 to secure the straightness of the vertical reciprocating movement of the pump piston 350 and the rack bar 380.

The brake actuation unit 100 according to the embodiment of the present invention generally includes a brake actuation unit housing 140, the input rod assembly 160 and the pedal simulator 130. The brake actuation unit housing 140 is provided with the master cylinder 170 formed to extend in the first axis direction, and the input rod assembly 160 is inserted and coupled into the brake actuation unit housing 140 along the axis of rotation of the motor 310 and a second axis perpendicular to the first axis, i.e., in the axis of rotation direction of the worm wheel 360. The pedal simulator 130 may be preferably inserted and coupled into a portion of the brake actuation unit housing 140 opposite to the coupling portion of the input rod assembly 160.

Meanwhile, as shown in FIGS. 1 to 4, preferably, the valve block 200 is constituted by a valve unit including a plurality of solenoid valves, one side of the valve block 200 comes in contact with the electronic control unit 400 and the other side of the valve block 200 is disposed to come in contact with the brake actuation unit housing 140 to minimize a volume of the integrated dynamic brake apparatus. In addition, the reservoir 500 may be disposed to come in contact with an upper portion of the brake actuation unit housing 140, and may be configured to be detachably attached to the brake actuation unit housing 140.

Meanwhile, the electronic control unit 400 may include a valve coil configured to control opening/closing of the valve block 200 and a motor position sensor configured to detect a position of the motor 310. The motor position sensor can detect a variation in magnetic flux due to rotation of a magnetic body installed in the motor 310 to detect a position of the motor 310. In addition, a terminal formed at one side of the motor 310 and coupled to a contact portion for application of 3-phase power to the motor is installed at the electronic control unit 400 to supply power to the motor.

Hereinafter, an integrated dynamic brake apparatus according to another embodiment of the present invention will be described, and overlapping description of the integrated dynamic brake apparatus according to the embodiment of the present invention will be omitted. The integrated dynamic brake apparatus according to the other embodiment of the present invention includes the hydraulic pressure generating unit 300, the brake actuation unit 100, the valve block 200 and the electronic control unit 400. In particular, one side of the motor 310 is in contact with a lower portion of a first surface of the electronic control unit 400, and the other side of the motor 310 is connected to the worm shaft 370. The valve block 200 is disposed over the motor 310, one side surface of the valve block 200 comes in contact with an upper portion of the first surface of the electronic control unit 400, the axis of rotation of the worm shaft 370 is perpendicular to the first surface, and the pump piston 350 linearly reciprocates to be parallel to a vertical direction of the first surface.

In particular, the hydraulic pressure generating unit 300 may include the worm shaft 370, the worm wheel 360, the pinion 340, the rack bar 380 and the pump piston 350, as described above, the worm shaft 370 is disposed at the other side of the motor 310 to be coaxially connected to a rotor of the motor 310, and the worm wheel 360 is engaged with the worm shaft 370. The axis of rotation of the worm wheel 360 may be preferably perpendicular to the axis of rotation of the motor 310 and parallel to the horizontal direction of the first surface. In addition, the pinion 340 has the same axis of rotation as that of the worm wheel 360, the rack bar 380 is engaged with the pinion 340 to linearly reciprocate along the vertical direction of the first surface based on rotation of the pinion 340, and the pump piston 350 is connected to one side of the rack bar 380.

All technical features described in the integrated dynamic brake apparatus described in the embodiment of the present invention can also be applied to the integrated dynamic brake apparatus according to the other embodiment of the present invention.

As can be seen from the foregoing, the integrated dynamic brake apparatus according to the present invention can freely adjust the linear reciprocating movement direction of the pump piston by transmitting the rotational power of the motor to the pump piston using the worm shaft, the worm wheel, the pinion and the rack bar, and thus, a degree of design freedom of the vehicle can be secured.

In addition, according to the present invention, the ECU contacting the other side surface of the valve block and having one surface in contact with a rear end surface of the motor is provided to simultaneously control the valves of the valve block and the position of the motor using a single ECU.

While the above-mentioned description merely exemplarily describes the technical spirit of the present invention, those skilled in the art can make various modifications and deformations without departing from the spirit of the present invention. Accordingly, the embodiments disclosed in the present invention are provided for description rather than limitation of the technical spirit of the present invention, and the scope of the technical spirit of the present invention is not limited by the embodiments. The scope of the present invention should be interpreted according to the following claims, and all technical spirit in the same scope should be interpreted as being included in the scope of the present invention.

[Reference Signs List]

| | |
|---|---|
| 100: brake actuation unit | 110: master cylinder |
| 120: reservoir | 130: pedal simulator |
| 140: brake actuation unit housing | 150: mounting bracket |
| 160: input rod assembly | 170: master cylinder |
| 200: valve block | 300: hydraulic pressure generating unit |
| 310: motor | 320: bearing |
| 340: pinion | 350: pump piston |
| 360: worm wheel | 370: worm shaft |
| 380: rack bar | 381: protrusion |
| 385: connector | 390: hydraulic pressure generating unit housing |
| 400: electronic control unit | 500: reservoir |

What is claimed is:

1. An integrated dynamic brake apparatus comprising a hydraulic pressure generating unit configured to convert rotational power of a motor into linear reciprocating movement;
   a brake actuation unit including a master cylinder disposed separately at one side of a pump piston included in the hydraulic pressure generating unit;
   a valve block disposed over the motor and configured to control discharging of a fluid accommodated in the master cylinder; and
   an electronic control unit disposed at one side of the motor and configured to control the motor and the valve block,
   wherein the pump piston linearly reciprocates along a first axis perpendicular to an axis of rotation of the motor,
   wherein the hydraulic pressure generating unit comprises:
      a rack bar engaged with a pinion and configured to linearly move in a first axis direction based on rotation of the pinion, the pump piston being connected to one side of the rack bar, and
   wherein a protrusion is formed at one side of the rack bar, an insertion groove is formed in the pump piston at a position corresponding to the protrusion, and the protrusion is inserted into the insertion groove to couple the rack bar and the pump piston.

2. The integrated dynamic brake apparatus according to claim 1, wherein the hydraulic pressure generating unit further comprises:
a worm shaft disposed at the other side of the motor and coaxially connected to a rotor of the motor; and
a worm wheel engaged with the worm shaft and configured to rotate about a second axis perpendicular to both of the axis of rotation of the motor and the first axis based on rotation of the worm shaft.

3. The integrated dynamic brake apparatus according to claim 2, wherein
the pinion has the same axis of rotation as that of the worm wheel.

4. The integrated dynamic brake apparatus according to claim 3, wherein the hydraulic pressure generating unit further comprises a hydraulic pressure generating unit housing configured to accommodate the worm shaft, the worm wheel, the pinion and the rack bar, and
the other side of the motor is disposed to come in contact with the hydraulic pressure generating unit housing.

5. The integrated dynamic brake apparatus according to claim 3, wherein a portion of the rack bar opposite to a portion engaged with the pinion is supported by at least one bearing.

6. The integrated dynamic brake apparatus according to claim 5, wherein the brake actuation unit comprises:
a brake actuation unit housing including the master cylinder formed to extend in the first axis direction;
an input rod assembly inserted and coupled into the brake actuation unit housing along a second axis perpendicular to both of the axis of rotation of the motor and the first axis; and
a pedal simulator accommodated in a portion of the brake actuation unit housing opposite to the input rod assembly.

7. The integrated dynamic brake apparatus according to claim 6, wherein one side and the other side of the valve block are disposed to come in contact with each of the electronic control unit and the brake actuation unit housing.

8. The integrated dynamic brake apparatus according to claim 6, further comprising a reservoir in contact with an upper portion of the brake actuation unit housing.

9. The integrated dynamic brake apparatus according to claim 1, wherein a spherical protrusion port is formed at an end of the protrusion,
a connector formed to accommodate the spherical protrusion port is provided at an end of the insertion groove, and
the protrusion port is caulked to the connector.

10. The integrated dynamic brake apparatus according to claim 1, wherein a connector configured to apply 3-phase power to the motor and a magnetic body configured to detect a position of the motor are disposed at one side of the motor.

11. The integrated dynamic brake apparatus according to claim 10, wherein the electronic control unit comprises:
a valve coil configured to control opening/closing of the valve block; and
a motor position sensor configured to detect a position of the motor by detecting a variation in magnetic flux of the magnetic body.

12. An integrated dynamic brake apparatus comprising a hydraulic pressure generating unit configured to convert rotational power of a motor into linear reciprocating movement;
a brake actuation unit including a master cylinder disposed separately at one side of a pump piston included in the hydraulic pressure generating unit;
a valve block disposed over the motor and configured to control discharging of a fluid accommodated in the master cylinder; and
an electronic control unit disposed at one side of the motor and configured to control the motor and the valve block,
wherein one side of the motor comes in contact with a lower portion of a first surface of the electronic control unit and the other side of the motor is connected to a worm shaft,
the valve block is disposed over the motor and one side surface of the valve block comes in contact with an upper portion of the first surface of the electronic control unit, and
an axis of rotation of the worm shaft is perpendicular to the first surface and the pump piston linearly reciprocates to be parallel to a vertical direction of the first surface,
wherein the hydraulic pressure generating unit comprises:
a rack bar engaged with a pinion and configured to linearly move in a first axis direction based on rotation of the pinion, the pump piston being connected to one side of the rack bar, and
wherein a protrusion is formed at one side of the rack bar, an insertion groove is formed in the pump piston at a position corresponding to the protrusion, and
the protrusion is inserted into the insertion groove to couple the rack bar and the pump piston.

13. The integrated dynamic brake apparatus according to claim 12, wherein the hydraulic pressure generating unit further comprises:
the worm shaft disposed at the other side of the motor and coaxially connected to a rotor of the motor; and
a worm wheel engaged with the worm shaft,
wherein the axis of rotation of the worm wheel is perpendicular to the axis of rotation of the motor and parallel to a horizontal direction of the first surface.

14. The integrated dynamic brake apparatus according to claim 13, wherein
the pinion has the same axis of rotation as that of the worm wheel.

* * * * *